United States Patent [19]
Jang

[11] Patent Number: 5,634,865
[45] Date of Patent: Jun. 3, 1997

[54] HYDRAULIC CONTROL SYSTEM FOR VEHICLE AUTOMATIC TRANSMISSION

[75] Inventor: Jaeduk Jang, Kyungki-do, Rep. of Korea

[73] Assignee: Hyundai Motor Corp., Seoul, Rep. of Korea

[21] Appl. No.: 555,066

[22] Filed: Nov. 8, 1995

[30] Foreign Application Priority Data

Nov. 9, 1994 [KR] Rep. of Korea ............... 94-29309
Nov. 9, 1994 [KR] Rep. of Korea ............... 94-29318

[51] Int. Cl.$^6$ ............................................. F16H 61/08
[52] U.S. Cl. ............................................. 475/128
[58] Field of Search ............................. 475/127, 128

[56] References Cited

U.S. PATENT DOCUMENTS

| | | | |
|---|---|---|---|
| 4,395,927 | 8/1983 | Muller et al. | 475/128 |
| 5,113,723 | 5/1992 | Ishino et al. | 475/128 |
| 5,288,279 | 2/1994 | Sakai et al. | 475/128 |
| 5,342,253 | 8/1994 | Mizobe et al. | 475/128 |

*Primary Examiner*—Dirk Wright
*Attorney, Agent, or Firm*—Finnegan, Henderson, Farabow, Garrett & Dunner

[57] ABSTRACT

Disclosed is a hydraulic control system for an automatic transmission, including a hydraulic pump; a regulator valve for constantly regulating hydraulic pressure generated from said hydraulic pump; a reducing valve for reducing hydraulic pressure regulated by the regulator valve; a first-to-second speed shift valve for feeding hydraulic pressure to a friction member which is applied as a reacting element in a second speed; and a second-to-third/fourth-to-third speed shift valve for feeding hydraulic pressure to another friction member which is applied in third and fifth speeds. The first-to-second and second-to-third/fourth-to-third speed shift valves are respectively provided with control ports to which hydraulic pressure which is used for applying a friction member in fourth and fifth speeds is fed. The control ports are connected to a line, the line being provided with a shuttle valve.

5 Claims, 3 Drawing Sheets

|   |   | C1 | C2 | C3 | B1 | B2 | B3 | E/B |
|---|---|----|----|----|----|----|----|-----|
|   | P |    |    |    |    |    |    | ×   |
|   | R |    |    | ○  |    | ○  |    | ○   |
|   | N |    |    |    |    |    |    | ×   |
| D | 1 | ○  |    |    | ○  |    |    | ○   |
|   | 2 | ○  |    |    |    | ○  |    | ○   |
|   | 3 | ○  |    |    |    |    | ○  | ○   |
|   | 4 | ○  | ○  |    |    |    |    | ○   |
|   | 5 |    | ○  |    |    |    | ○  | ○   |

| Valve \ Shift mode | R | 1 | 2 | 3 | 4 | 5 | Remark |
|---|---|---|---|---|---|---|---|
| SOL-1 | — | OFF | OFF | OFF | OFF | ON | N/O Type |
| SOL-2 | OFF | ON | OFF | OFF | OFF | OFF | N/O Type |
| SOL-3 | — | ON | ON | OFF | OFF | OFF | N/O Type |
| SOL-4 | — | OFF | OFF | OFF | ON | ON | N/C Type |

HYDRAULIC CONTROL SYSTEM FOR VEHICLE AUTOMATIC TRANSMISSION

BACKGROUND OF THE INVENTION

1. Field of the Invention

The present invention relates to a hydraulic control system for a vehicle automatic transmission, whereby locking of a brake, which is a reacting element, can be prevented during the shift operation between a second speed to a fourth speed and responsiveness of the shift operation is improved.

2. Description of Related Art

In general, an automatic transmission provides a necessary gear ratio to operate the vehicle under a wide range of speeds and loads. It does this with a minimum amount of effort on the part of the driver. That is, automatic upshifts and downshifts are a convenience for the driver because a foot-operated clutch is not required to shift gears, and because the vehicle can be brought to a stop without the use of a clutch and without shifting the transmission into neutral.

A conventional automatic transmission for a vehicle comprises a torque converter having an impeller, a turbine and a stator, a gear train connected to the torque converter to provide various forward speed ranges and reverse, a plurality of friction members such as disc clutches, one-way clutches which control gear action, and a hydraulic control system for controlling the operation of the friction members.

The gear train is selectively operated by applying each friction member as an input element, an output element or a reacting element. The application or release of each friction member is performed in order.

However, if one friction member is applied before another previously-applied friction member is released, the gear train may be damaged.

In addition, the gear train generally used a one-way clutch for reacting force of a rotating member. The use of the one-way clutch makes the gear train complicated.

SUMMARY OF THE INVENTION

Accordingly, it is the object of the present invention to provide a hydraulic control system for an automatic transmission to which a safety device is applied which can prevent the friction members from disorderly operation.

It is another object of the present invention to provide a hydraulic control system for an automatic transmission which can simplify the gear train and improve the responsiveness with respect to the shift operation.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention provides a fail-safe device of a hydraulic control system for an automatic transmission, comprising: a hydraulic pump; a regulator valve for regulating hydraulic pressure generated from said hydraulic pump constant; a reducing valve for reducing hydraulic pressure regulated by the regulator valve; a first-to-second speed shift valve for feeding hydraulic pressure to a friction member which is applied as a reacting element in a second speed; and a second-to-third/fourth-to-third speed shift valve for feeding hydraulic pressure to another friction member which is applied in third and fifth speeds; wherein the first-to-second and second-to-third/fourth-to-third speed shift valves are respectively provided with control ports to which hydraulic pressure which is used for applying a friction member in fourth and fifth speeds is fed; and the control ports are connected to a line, said line being provided with a shuttle valve.

In another aspect, the present invention provides a fail-safety device, wherein the first-to-second speed shift valve includes a first valve spool and a first spring for biasing the first valve spool, and the second-to-third/fourth-to-third speed shift valve includes a second valve spool and a second spring for biasing the second valve spool, the coefficient of elasticity of the first spring being larger than that of the second spring.

BRIEF DESCRIPTION OF THE DRAWINGS

The accompanying drawings, which are incorporated in and constitute a part of this specification, illustrate one embodiment of the invention and together with the description, serve to explain the principles of the invention.

DETAILED DESCRIPTION OF A PREFERRED EMBODIMENT

Figure 1:
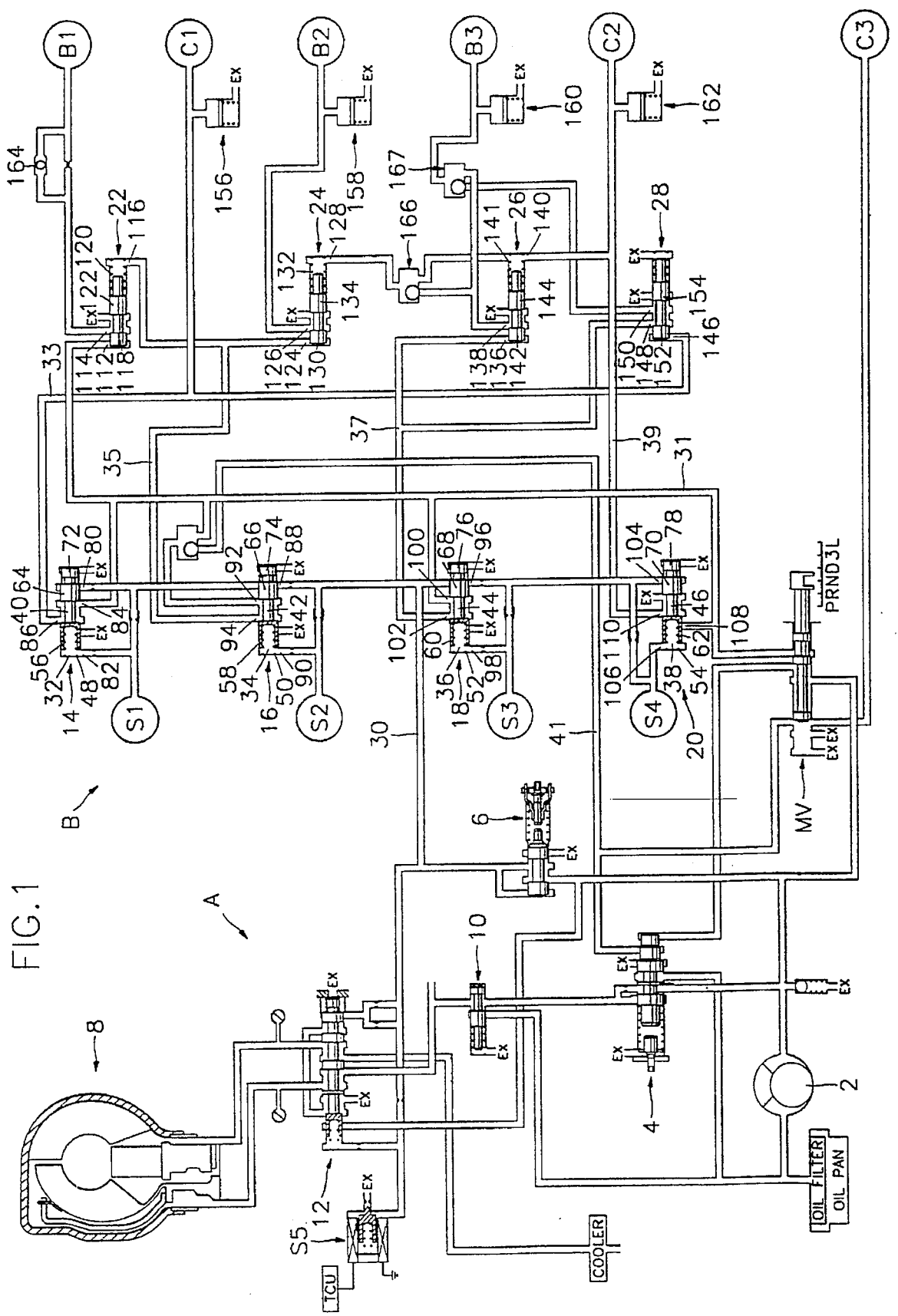
FIG. 1 is a view showing a hydraulic control system of an automatic transmission according to a preferred embodiment of the present invention.

Reference will now be made in detail to the present preferred embodiment of the invention, an example of which is illustrated in the accompanying drawings. Wherever possible, the same reference numbers will be used throughout the drawings to refer to the same or like parts.

Certain terminology will be used in the following description for convenience and reference only and will not be limiting. The words "right" and "left" will designate directions in the drawings to which reference is made.

A preferred embodiment of the hydraulic control system according to the present invention is shown is FIG. 1. In FIG. 1, the control system is depicted in a neutral state, or "N" range.

The hydraulic control system comprises a line pressure regulating part A for converting hydraulic pressure fed from a hydraulic pump 2 into constant pressure, and a shift control part B for selectively feeding hydraulic pressure from the line pressure regulating part A to each friction member.

The line pressure regulating part A comprises a regulating valve 4 for regulating hydraulic pressure generated from the hydraulic pump 2 constant, a reducing valve 6 for reducing hydraulic pressure from the regulating valve 4 to be lower than line pressure, and a torque converter control valve 10 and a damper clutch control valve 12 for controlling a damper clutch to improve power transmission efficiency.

Figure 2:
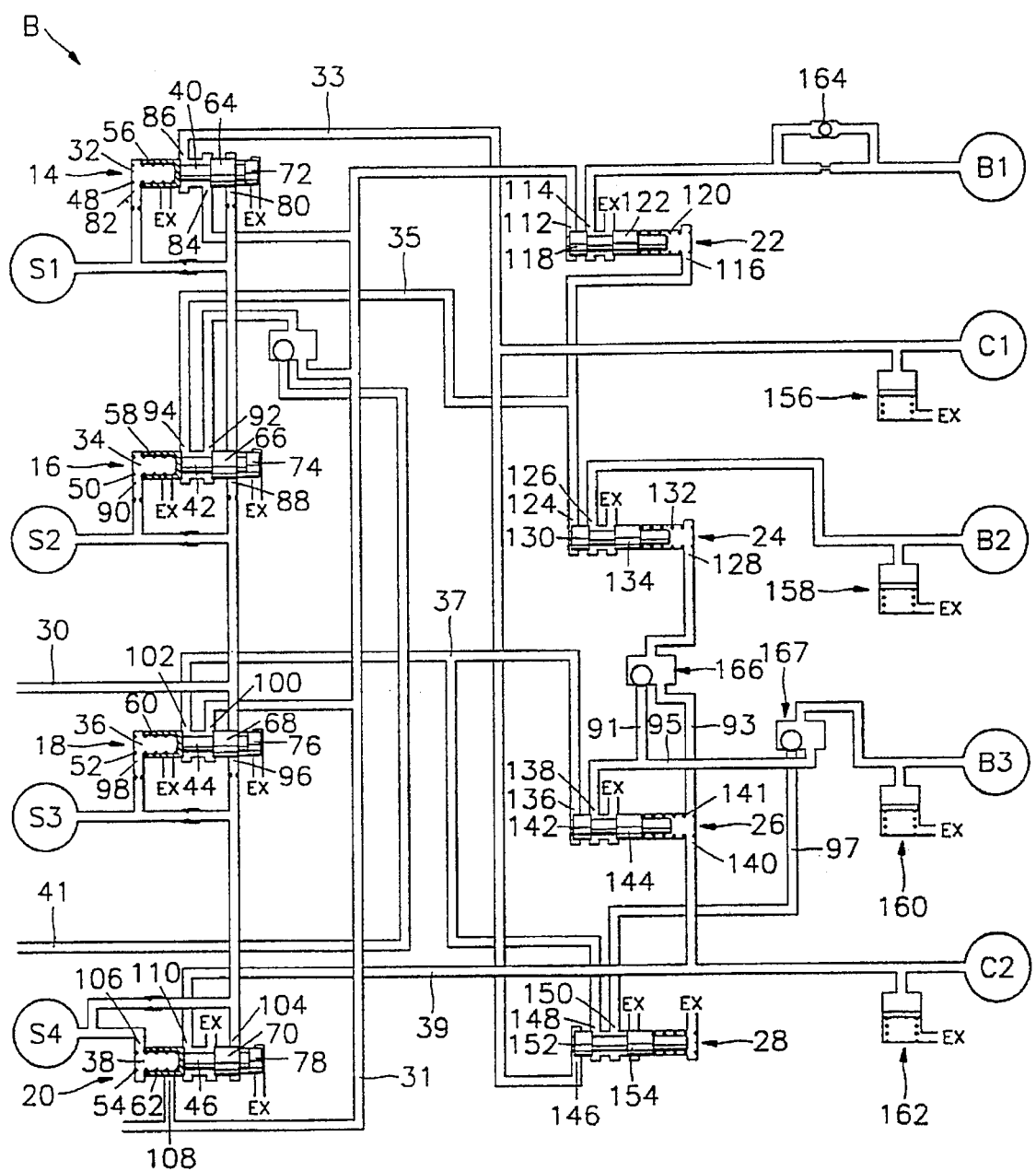
FIG. 2 is an enlarged view of the shift control part depicted in FIG. 1.

The shift control part B comprises, as shown in FIG. 2, first to fourth pressure control valves 14, 16, 18 and 20, an N-D control valve 22, a first-to-second speed shift valve 24, a second-to-third/fourth-to-third speed shift valve 26, and a fourth-to-fifth speed shift valve 28.

The first to fourth pressure control valves 14, 16, 18 and 20 are connected to the reducing valve 6 through a line 30 to thereby receive control pressure therefrom. All of the pressure control valves have the same structure as each other. That is, each pressure control valve includes a spool groove 32, 34, 36 and 38, respectively and a valve spool 40, 42, 44 and 46, respectively.

Each valve spool 40, 42, 44 and 46 has a respective plug 56, 58, 60 and 62, each of which is biased by a respective spring 48, 50, 52 and 54, a respective first land 64, 66, 68 and 70, which is integrally formed with the respective plug, and a respective second land 72, 74, 76 and 78.

The spool groove 32 is provided with a first port 80 for receiving hydraulic pressure from a line 30, a second port 82 at or through which hydraulic pressure is formed or released in accordance with the operation of a first solenoid valve S1 which is On/Off controlled by a transmission control unit, a third port 84 for receiving line pressure from a line 31, and a fourth port 86 for feeding the line pressure to the fourth-to-fifth speed shift valve 28 through a line 33.

Further, the spool groove 34 of the second pressure control valve 16 is provided with a first port 88 for receiving hydraulic pressure from the line 30, a second port 90 at or through which hydraulic pressure is formed or released in accordance with the operation of a second solenoid valve S2 which is also On/Off controlled by the transmission control unit, a third port 92 for receiving line pressure from the line 31, a fourth port 94 for feeding the line pressure to both the first-to-second speed shift valve 24 and the N-D control valve 22.

Further, the spool groove 36 of the third pressure control valve 18 is provided with a first port 96 for receiving hydraulic pressure from the line 30, a second port 98 at or through which hydraulic pressure is formed or released in accordance with the operation of the third solenoid valve S3 which is also On/Off controlled by a transmission control unit, a third port 100 for receiving line pressure from the line 31, and a fourth port 102 for feeding the line pressure to the second-to-third/fourth-to-third speed shift valve 26 and the fourth-to-fifth speed shift valve 28 through the line 37.

Further, the spool groove 38 of the fourth pressure control valve 20 is provided with a first port 104 for receiving hydraulic pressure from the line 30, a second port 106 at or through which hydraulic pressure is formed or released in accordance with the operation of a fourth solenoid valve S4, a third port 108 for receiving line pressure from the line 31, and a fourth port 110 for feeding the line pressure to both the second-to-third/fourth-to-third speed shift valve 26 and the first-to-second speed shift valve 24.

The N-D control valve 22 is provided with a first port 112 communicating with the line 31 to directly receive hydraulic pressure therefrom and a second port 114 for feeding hydraulic pressure coming through the first port 112 to the first friction member B1.

The N-D control valve 22 is further provided with a third port 116 for receiving hydraulic pressure from the second pressure control valve 16 via a line 35. The first to third ports are varied in accordance with the movement of a valve spool having a first land 118 and a second land 122 biased by a spring 120.

The first-to-second shift valve 24 is provided with a first port 124 connected to the second pressure control valve 16 via the line 35, and second port 126 connected to the third friction member B2 to feed application pressure thereto.

The first-to-second speed shift valve 24 is further provided with a third port 128 connected to third and fourth pressure control valves 18 and 20 via lines 37 and 39, respectively, to thereby selectively receive control pressure therefrom.

The first-to-second speed shift valve 24 includes a valve spool having a first land 130 and a second land 134 biased by a spring 132.

The second-to-third/fourth-to-third speed shift valve 26 is provided with a first port 136 connected to the third pressure control valve 18 via the line 37 to thereby receive hydraulic pressure therefrom, a second port 138 for feeding application pressure coming through the first port 136 to a fourth friction member B3, and a third port 140 connected to the fourth pressure control valve 20 through the line 39 to thereby receive control pressure therefrom.

The second-to-third/fourth-to-third speed shift valve 26 includes a valve spool having a first land 142 and a second land 144 biased by a spring 141. The elastic force of the spring 141 is smaller than that of the spring 132 such that control can be carried out in turn by the hydraulic pressure.

The fourth-to-fifth speed shift valve 28 is provided with a first port 146 receiving hydraulic pressure from the first pressure control valve 14 through the line 33, a second port 148 for receiving application pressure from the third pressure control valve 18 through the line 37, and a third port 150 for feeding the application pressure to a fourth friction member B3.

The fourth-to-fifth speed shift valve 28 includes a valve spool having first and second lands 152 and 154.

Hydraulic pressure is directly fed from the fifth pressure control valve 20 to a fifth friction member C2 through the line 39 at fourth and fifth speeds of a drive mode or "D" range.

Accumulators 156, 158, 160 and 162 are respectively mounted on the lines connected respectively to the second to fifth friction members C1, B2, B3 and C2. These accumulators temporally accumulate application pressure when the application pressure is fed to each friction member, such that abrupt application of each friction member can be prevented, thereby accomplishing the smooth shift operation.

The third port 128 of the first-to-second speed shift valve 24 is connected to the second and third ports 138 and 140 of the second-to-third/fourth-to-third speed shift valve 26 through lines 91 and 93, respectively. On a place where the lines 91 and 93 meet each other, a shuttle valve 166 is disposed to feed hydraulic pressure from one of the lines 91 and 93 to the third port 128 of the first-to-second speed shift valve 24.

Further, the second port 138 of the second-to-third/fourth-to-third speed shift valve 26 and the third port 150 of the fourth-to-fifth speed shift valve 28 are designed to selectively feed hydraulic pressure to the fourth friction member B3. The selective feeding of the hydraulic pressure is accomplished by a shuttle valve 167 which is mounted on a place where the lines 95 and 97 meet.

Figures 3, 4, 5:
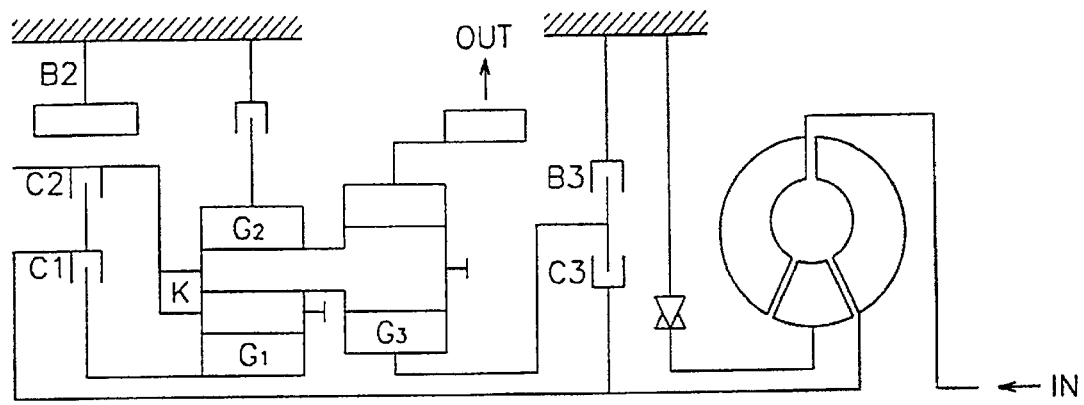
FIG. 3 is a schematic view showing a gear train which is controlled by the hydraulic control system depicted in FIG. 1.
FIG. 4 is a table illustrating combination of friction members at each speed ratio in the automatic transmission according to the present invention, respectively.
FIG. 5 is a table showing the operation status of the solenoid valves used in the hydraulic control system shown in FIG. 1 for each mode.

The hydraulic control system as described above is used for controlling a gear train having more than one planetary gear as shown in FIG. 3.

Operation of the Hydraulic Control System

FIG. 4 illustrates the combination of friction members at each speed mode, and FIG. 5 charts the operation status of the solenoid valves for each mode. The solenoid valves S1, S2 and S3 are types of normally open valves and the solenoid valve S4 is a type of normally closed valve.

First Speed Operation of the "D" Range

In the shift operation of the first speed, hydraulic pressure generated from the hydraulic pump 2 is fed to the first pressure control valve 14 and the N-D control valve 22 via the manual valve MV along a line 31.

At this point, since the first and fourth solenoid valves S1 and S4 are controlled to OFF states according to a duty ratio by the transmission control unit as charted in FIG. 5, the valve spool of the first pressure control valve 14 is displaced towards the right such that hydraulic pressure flowing along the line 31 flows to the line 33.

Accordingly, a portion of the hydraulic pressure within the line 33 is directly fed to the second friction member C1.

At this point, hydraulic pressure coming through the first port 112 of the N-D control valve 22 pushes the valve spool and is fed to the first friction member B1 through the second port 114, thereby accomplishing the first speed.

By this hydraulic control operation, in the gear train, rotating power of an input shaft X of the transmission is induced into a sun gear G1 through the second friction member C2, and at this point, a ring gear G2 operates as a reacting element by the application of the first friction member B1.

However, application pressure fed to the second friction member C1 is temporarily accumulated by the accumulator 156 so that the abrupt application of the second friction member C1 can be prevented to thereby improve the shift quality.

Second Speed Operation of the "D" Range

As the vehicle speed and the throttle opening increase, the transmission control unit starts to control the first, second, and fourth solenoid valves S1, S2, and S4 to OFF states according to a duty ratio as charted in FIG. 5. Accordingly, application pressure of the second friction member C1 maintains. However, since a portion of hydraulic pressure within the line 31 is fed as control pressure from the second pressure control valve 16 to the third port 116 of the N-D control valve 22 through the line 35, the valve spool of the N-D control valve 22 is displaced towards the left such that communication between the first and second port 112 and 114 of the N-D control valve 22 is disconnected.

Accordingly, hydraulic pressure which has been used as application pressure of the first friction member in the first speed is exhausted through the exit port Ex.

Further, another portion of hydraulic pressure within the line 31 is fed to the first port 124 of the first-to-second speed shift valve 24 to displace the valve spool thereof towards the right and is then fed to the third friction member B2 through the second port 126.

That is, the first friction member B1 which has been applied in the first speed is released and the third friction member B2 is additionally applied with the second friction member C1, thereby accomplishing the second speed.

By this hydraulic control operation, in the gear train depicted in FIG. 3, the friction member B1 which has been applied as a reacting element is released and the friction member B2 is newly applied as a reacting element to restrict a planet carrier K.

Third Speed Operation of the "D" Range

As the vehicle speed and the throttle opening increase further, the transmission control unit starts to control the third solenoid valve S3 to an OFF state in addition to the first, second, and fourth solenoid valves S1, S2, and S4 according to a duty ratio as charted in FIG. 5. Accordingly, all of the valve spools of the first to fourth pressure control valves are displaced towards the right.

By this operation, hydraulic pressure within the line 31 is fed to the N-D control, first-to-second speed shift, and second-to-third/fourth-to-third speed shift valves 22, 24 and 26 via the first to third pressure control valves 14, 16 and 18 and lines 33, 35 and 37, respectively.

Accordingly, the second friction member C1 maintains its application state. At this point, since control pressure is fed from the third pressure control valve 18 to the third port 128 of the first-to-second speed shift control valve 24 along the line 37, the valve spool of the first-to-second speed shift valve 24 is displaced towards the left such that communication of the first and second port 112 and 114 of the first-to-second speed shift valve 24 are disconnected.

Accordingly, supply of hydraulic pressure to the third friction member B2 is interrupted, and at the same time, a portion of control pressure of the first-to-second speed shift valve is supplied to the fourth friction member B3 along the line 91, thereby accomplishing the third speed.

By this hydraulic control operation, in the gear train depicted in FIG. 3, the fourth friction member B3 is applied as a reacting element to restrict the sun gear G3.

Fourth Speed Operation of the "D" Range

As the vehicle speed and the throttle opening increase further, the transmission control unit starts to control only the fourth solenoid valve S4 to an ON state to interrupt hydraulic pressure directed to the line 37.

By this operation, hydraulic pressure which has been directed to the fourth friction member B3 is disconnected and, at this point, hydraulic pressure within the line 31 is directed to the fifth friction member C2 along the line 39 since the valve spool of the fourth pressure control valve 20 is displaced towards the left.

In other word, the second friction member C1 maintains its application state and the friction member B3 is released. Further, the fifth friction member C2 is applied to accomplish the fourth speed.

In this fourth speed state, there are two input elements (second and fifth friction members C1 and C2) without the reaction element.

Fifth Speed Operation of the "D" Range

As the vehicle speed and the throttle opening increase further, the transmission control unit starts to control the first and fourth solenoid valves S1 and S4 to ON states and the second and third solenoid valves S2 and S3 to OFF states. Accordingly, the valves spools of the first and fourth pressure control valves are displaced towards the left and the valve spools of the second and third pressure control vales towards the right.

By this operation, the fifth friction member C2 maintains its application state, hydraulic pressure within the line 33 is interrupted by the first pressure control valve 14 such that the second friction member C1 which has been applied in the fifth speed is released.

Further, hydraulic pressure directing to the line from the third pressure control valve 18 is directed to the second and third ports 148 and 150 of the fourth-to-fifth speed shift valve 28 and then fed to the fourth friction member B3 through the shuttle valve 167.

By this hydraulic control operation, in the gear train depicted in FIG. 3, the fourth friction member B3 is applied as a reacting element to restrict the sun gear G3 and the planet carrier receives rotating force from the input shaft X.

The hydraulic control system as described above has a fail-safe function as a major feature of the present invention, which can prevent the friction members from disorderly applying or releasing the shifting operation.

That is, in a shifting operation from second speed to third speed in the drive "D" range, the second friction member C1 should be applied as an input element and the fourth friction member B3 should be applied as a reacting element. In this case, control pressure is directed to the line 95 along the line 37 via the first and second ports 136 and 138 of the third pressure control valve 18.

The control pressure is directed to the third port 134 of the first-to-second speed shift valve 24 via the shuttle valves 166 and 167 to thereby displace the valve spool towards the left, thereby disconnecting the first and second ports with each other. As a result, hydraulic pressure which has been fed to the third friction member B2 is interrupted as, at the same time, application pressure is fed to the fourth friction member B3.

Displacement of the valve spool of the first-to-second speed shift valve 24 towards the left is for releasing the third friction member B2 which has been applied in the second speed. Application pressure for the third friction member B2 is exhausted through the exit port Ex of the first-to-second speed shift valve 24.

In addition, when the speed ratio is changed from the third speed to the fourth speed, the second and fifth friction members C1 and C2 should be simultaneously applied and the fourth friction member B3 should be released.

To achieve this operation, the valve spool of the second-to-third/fourth-to-third speed shift valve 26 is displaced towards the left by hydraulic pressure coming through the third port 140 such that hydraulic pressure which has been fed to the fourth friction member B3 through the line 95 is interrupted.

At this point, control pressure is fed to the third port 128 of the first-to-second speed shift valve through the shuttle valve 166 against the application of the third friction member B2, such that the third friction member B2 is not applied.

Further, when the speed ratio is changed from the fourth speed to the third speed, control pressure for controlling the valve spools of the first-to-second and the second-to-third/fourth-to-third speed shift valves 24 and 26 is exhausted by releasing application pressure of the fifth friction member C2.

Accordingly, the third and fourth friction members B2 and B3 are simultaneously applied. However, since the coefficient of elasticity of the spring 132 biasing the valve spool of the first-to-second speed shift valve 24 is larger than that of the spring 141 biasing the valve spool of the second-to-third/fourth-to-third speed shift valve 26, the valve spool of the first-to-second speed shift valve 24 is displaced after the valve spool of the second-to-third/fourth-to-third speed shift valve 26 is displaced, such that application of the third friction member B2 is prevented.

As described above, the fail-safe system of the hydraulic control system can prevent the friction members from disorderly applying by use of two shift valves and one shuttle valve such that the breakdown of the gear train can be prevented.

Further, the first-to-second speed shift valve and the second-to-third/fourth-to-third are operated in order by the springs which have different coefficients of elasticity from each other, such that time control is possible and the interlock can be prevented.

It will be apparent to those skilled in the art that various modifications and variations can be made in the hydraulic control system of the present invention and in the construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A hydraulic control system for an automatic transmission, comprising:

a hydraulic pump;

a regulator valve for regulating hydraulic pressure generated from said hydraulic pump constant;

a reducing valve for reducing hydraulic pressure regulated by said regulator valve;

a pressure control part including first to fourth pressure control valves which are controlled by first to fourth solenoid valves respectively, to independently simultaneously control a plurality of friction; members, wherein as a result of each respective control pressure from the pressure control valves, a respective friction member is applied or released; and a shift control part including an N-D control valve, a first-to-second speed shift valve, a second-to-third/fourth-to-third speed shift valve, and a fourth-to-fifth speed shift valve, all of which receive control pressure from the pressure control part, feed hydraulic pressure to the friction members and apply the friction members, wherein the first-to-second speed shift valve feeds hydraulic pressure to one of the friction members which is applied as a reacting element in a second speed, the second-to-third/fourth-to-third speed shift valve feeds hydraulic pressure to one of the friction members which is applied in third and fifth speeds, and the first-to-second and second-to-third/fourth-to-third speed shift valves are respectively provided with control ports to which hydraulic pressure, which is used for applying one of the friction members in fourth and fifth speeds, is fed for closing the respective speed shift valve.

2. The hydraulic control system according to claim 1, wherein the control ports are connected to a line which is provided with a shuttle valve for feeding pressure which is used for applying the friction member which is applied in third or fifth speeds.

3. The hydraulic control system according to claim 1, wherein said first-to-second speed shift valve includes a first valve spool and a first spring for biasing the first valve spool, and said second-to-third/fourth-to-third speed shift valve includes a second valve spool and a second spring for biasing the second valve spool, the coefficient of elasticity of said first spring being larger than that of said second spring.

4. A hydraulic control system for an automatic transmission, comprising:

a hydraulic pump;

a regulator valve for regulating hydraulic pressure generated from said hydraulic pump constant;

a reducing valve for reducing hydraulic pressure regulated by said regulator valve;

a pressure control part including first to fourth pressure control valves which are controlled by first to fourth solenoid valves, respectively, to independently simultaneously control a plurality of friction members for application or release; and a shift control part including an N-D control valve, a first-to-second speed shift valve, a second-to-third/fourth-to-third speed shift valve, and a fourth-to-fifth speed shift valve, all of which receive control pressure from the pressure control part and feed hydraulic pressure to the friction members;

wherein the first-to-second and second-to-third/fourth-to-third speed shift valves are respectively provided with control ports to which hydraulic pressure, which is used for applying a friction member in fourth and fifth speeds, is fed, and wherein the control ports are connected to a line which is provided with a shuttle valve.

5. A hydraulic control system for an automatic transmission, comprising:

a hydraulic pump;

a regulator valve for regulating hydraulic pressure generated from said hydraulic pump constant;

a reducing valve for reducing hydraulic pressure regulated by said regulator valve;

a pressure control part including first to fourth pressure control valves which are controlled by first to fourth solenoid valves, respectively, to independently simultaneously control a plurality of friction members for application or release; and a shift control part including an N-D control valve, a first-to-second speed shift valve, a second-to-third/fourth-to-third speed shift valve, and a fourth-to-fifth speed shift valve, all of which receive control pressure from the pressure control part and feed hydraulic pressure to the friction members;

wherein said first-to-second speed shift valve includes a first valve spool and a first spring for biasing the first valve spool, and said second-to-third/fourth-to-third speed shift valve includes a second valve spool and a second spring for biasing the second valve spool, the coefficient of elasticity of said first spring being larger than that of said second spring.

* * * * *